United States Patent [19]

Betts

[11] Patent Number: 4,511,938
[45] Date of Patent: Apr. 16, 1985

[54] MAGNETIZABLE RECORDING DISK AND DISK FILE EMPLOYING SERVO SECTOR HEAD POSITIONING

[75] Inventor: Alan J. Betts, Romsey, England

[73] Assignee: International Business Machines, Armonk, N.Y.

[21] Appl. No.: 504,764

[22] Filed: Jun. 15, 1983

[30] Foreign Application Priority Data

Jun. 18, 1982 [EP] European Pat. Off. ............ 82303180

[51] Int. Cl.³ ...................... G11B 5/58; G11B 21/10; G11B 23/34
[52] U.S. Cl. ....................................... 360/77; 360/135
[58] Field of Search ........................... 360/77, 78, 135

[56] References Cited

PUBLICATIONS

IBM Technical Disclosure Bulletin, vol. 20, No. 5, Oct. 1977, Phase and Location Coded Servo Pattern for Controlling the Magnetic Head in Track Seek and Track Follow Operations, KoHo Schaller, pp. 1792–1794.
IBM Technical Disclosure Bulletin, vol. 20, No. 5, Oct. 1977, Rotating Record Disk Initialization for Sector Servoing, J. C. Dennison et al., pp. 1789–1791.
IBM Technical Disclosure Bulletin, vol. 22, No. 8A, Jan. 1980, Track Servo System Compensating Pattern Defects, A. Malta et al., pp. 3269–3270.
IBM Technical Disclosure Bulletin, vol. 22, No. 12, May 1980, Quad-Burst Servo Pattern, C. C. Liu, pp. 5436–5438.

Primary Examiner—George G. Stellar
Attorney, Agent, or Firm—Walter J. Madden, Jr.

[57] ABSTRACT

A magnetizable recording disk is divided into data and servo sectors. The servo sectors include position reference information comprising a circumferentially extending and radially repeated magnetization pattern. Each such pattern comprises at least three subsets of elements from each of which a different phase of radial position error signal, indicating displacement from a data track center line, can be derived. The subsets are radially offset from each other by less than the pitch of the data tracks and their individual elements each have a radial width greater than the pitch of a data track. By making the width of the individual element of the servo pattern greater than that of the data tracks and, necessarily, greater than the physical width of the electromagnetic transducing head for reading and writing information on the disk, the contribution of neighboring elements to the signal sensed by the head via its fringing field is reduced. This results in a more linear position error signal in all regions where the head straddles the boundary between elements. A disk file comprising such a disk comprises, in addition to the electromagnetic transducing head, a head positioning actuator, position error signal generating means for generating the multiple phase position error signals and combining them into a composite signal and feedback means for feeding back the composite position error signal to control the actuator to correct for displacement of the head from a selected data track center line.

11 Claims, 11 Drawing Figures

MAGNETIZABLE RECORDING DISK AND DISK FILE EMPLOYING SERVO SECTOR HEAD POSITIONING

CROSS REFERENCE TO RELATED APPLICATIONS

Reference is made to copending application Ser. No 504,552 filed June 15, 1983, for a "Head Positioning System with Automatic Gain Control".

TECHNICAL FIELD OF THE INVENTION

The present invention relates to magnetizable recording disks and to disk files comprising such disks which employ servo sector head positioning.

BACKGROUND ART

Magnetic disk files in which information is stored on concentric tracks on one or more magnetizable recording disks are well known, particularly for data processing applications. Information is written on and read from the disks, while they are rotating, by electromagnetic transducing heads supported adjacent the disk surface. At typical state-of-art track densities of, say, 10 tracks/mm, the disk file must be provided with position reference information, which is employed by a head positioning servo system to position and maintain the head precisely over a selected track of the disk. The operation of maintaining the head over a desired track is known as "track following" whereas that of moving the head between tracks is known as "track accessing". Both these operations make use of such position reference information.

In some disk files, the position reference information is provided remotely from the disk surface on which the information or data to be processed is stored e.g. on a dedicated servo disk or disk surface. This has the advantage that position reference information is continuously available. However, at higher track densities, such an arrangement has the disadvantage that it is difficult to guarantee registration between the remote position reference information and the information storage tracks of the disk.

To overcome this disadvantage, it is also known to provide position reference information in sectors, known as "servo sectors", on the information storage surface. These servo sectors are interspersed with "data sectors" containing the stored information and provide accurately registered position reference information on a sampled basis as the disk rotates. The present invention is concerned with this type of sectored arrangement of disk file, early examples of which are described in U.S. Pat. No. 3,185,972 and UK Patent No. 1314695.

A more recent example of a sector servo disk file is described in European published patent application No. 13326. In this patent application, the servo sectors comprise a mark field of radially aligned magnetic transitions, in a unique order, which indicates the start of a servo sector. Following the mark field is a gain field also of radially aligned transitions which is employed for automatic gain control. Following the gain field, is a normal (N) servo field which contains position reference information in the form of a checkerboard pattern of magnetization in which transitions are aligned radially but are of opposite sense in alternate tracks. The tracks of the normal field are the same width as the data tracks but are arranged so that the boundary between them lies on the centre line of the data tracks. This information is read by the transducing head and demodulated to provide a position error signal indicating the position of the head relative to the nearest track centre and, consequently, the "on-track" condition. Since, in the on-track condition, the signal from the head should be zero, this type of servo pattern is sometimes known as a "null" pattern. Following the normal field is a quadrature (Q) field containing an identical null pattern to the normal field but offset from it radially by half a track width so that the tracks of the quadrature pattern are aligned with the data tracks. The quadrature field provides an additional phase shifted position error signal which is employed, together with the normal position error signal, in the access control system for the file.

Both the dedicated and sampled types of system employ the common principle that the position reference information contains contiguous servo tracks of two alternating types whose boundaries each, nominally, coincide with the centre of a data track. Signal contributions from each type of servo track, as detected by the transducing head, are subtracted from one another, either in the head itself or by demodulating circuitry to derive a position error signal from the difference in their amplitudes or areas. This position error signal varies cyclically with radial displacement of the head across the tracks. It is, ideally, linear between slope reversals and is zero when the head lies equally over the boundary of an adjacent pair of servo tracks. In practice, the position error signals derived by these methods are not linear except in a restricted range about zero. The peaks of the cyclic signals, corresponding to maximum off-data track displacement, are rounded and cannot be used as accurate indications of position. This non-linearity becomes more pronounced as track densities are increased.

Unfortunately, however, the need for greater accuracy and linearity of position error signals in sector servo and other disk files increases with increasing track density and decreasing access time. One reason for this is that, to position the head very accurately over the selected track and to minimise off-track deviations, it is necessary to employ the highest possible servo loop gain. Any non-linearity in the fed back position error signal can result in under or over correction and loop instability.

Another reason for greater linearity is the need to combine several portions of the position error signals from adjacent tracks to provide a composite position error signal which is linear over an extended range of several tracks. The provision of such a signal is important in the "settling" period at the end of an access motion since, at high track densities, the access control system can no longer guarantee to position the transducing head within the plus or minus half a track achievable at lower densities. A second need for an extended signal arises in a multiple disk file employing a number of heads nominally on the same "cylinder" on different disk surfaces. Because of misregistration between different disk surfaces, it cannot be guaranteed that heads which are nominally on the same cylinder will actually be located over the corresponding tracks. Thus when switching from one head to another nominally on the same cylinder, an extended linear position error signal is necessary to cope with offsets of more than one track between the heads.

Linearity of the position error signal at all positions of the head over the disk surface is also important in access control systems such as in the system described in European published patent application No. 013326. In that system, the position error signals, derived from servo sectors, are sampled throughout the access motion and compared with a continually available model position error signal of the same general form. The difference between the sampled actual and model position error signals, known as the Access Position Error is fed back to control the access motion. Since only a sampled actual position error signal is available, this signal must be linear whatever the head position on the disk surface when the sampling occurs.

To complete the review of the prior art, reference is made to the following two documents, though it will be noted that neither of these documents explicitly addresses the problem of position error signal linearity discussed above.

UK Patent No. 1566290 shows an alternative sector servo system in which the position error information is in the form of three bursts of high frequency signals which are circumferentially displaced from each other and radially offset by one data track width. Individually, the bursts are two tracks wide but bursts of each of the three types are separated from each other by a single track width. The position of every data track centre line is defined by the boundaries of two of the three bursts. The relative contributions of these two bursts to the head signal are separated in a conventional manner and used to generate a respective one of three position error signals. These three position error signals do not overlap and must be assumed to be linear across their entire range.

Finally, an article entitled "Quad-Burst PES System for Disk File Servo" by W A Herrington and F E Mueller (*IBM Technical Disclosure Bulletin* Vol. 21, No. 2, July 1978, p. 804) is referred to. This article describes a quadrature burst servo pattern for use in a disk file of the type employing a dedicated servo disk. The servo head width is equal to the burst width which is twice the width of a data track but it is mentioned that the servo head width could be anything between 1 and 3 data track widths. However, no advantage or suggestion of applicability to a sector servo type of disk file is suggested.

DISCLOSURE OF THE INVENTION

Although dual position error signals in space phase quadrature, such as described in the above referenced European published patent application No. 013326, could enable greater linearity to be achieved at all positions of the head by using a restricted relatively linear portion of each of the two signals alternately, the improvement has been found to be insufficient at track densities of current interest, particularly in sector servo files.

At track densities above 20 tracks/mm, all the prior art systems described above have proved inadequate to provide a position error signal of sufficient linearity and range for sector servo files.

The present invention significantly extends the position error signal linearity and provides a magnetizable recording disk divided into data sectors, each having a plurality of concentric tracks for the recording and reproducing of information by an associated magnetic transducing head, and having servo sectors, interspersed with the data sectors, containing position reference information defining the radial position of the data tracks for an associated head positioning servo system, the position reference information comprising a circumferentially extending and radially repeated magnetization pattern having at least two radially offset subsets of elements from each of which a different phase of radial position error signal, indicating displacement from a data track centre line, can be derived, the record member being characterised in that the position reference information pattern comprises at least three such subsets of elements, whose radial offset from each other is less than the pitch of the data tracks and whose individual elements each have a radial width greater than the pitch of a data track.

The invention also provides a disk file comprising such a rotatable magnetizable recording disk for the storage of information, an electromagnetic transducing head for writing information on and reading information from the magnetizable disk during relative motion therebetween, and a head positioning actuator responsive to actuator control signals to position the transducing head radially of the disk, position error signal generating means arranged to receive signals read by the transducing head and to generate from them, corresponding to each subset of the position reference information, a different phase of radial position error signal indicating the displacement of the head from a data track centre line, and to combine the different phase position error signals into a composite signal, and feedback means for feeding back the composite position error signal to control the head positioning actuator so as to correct for any displacement of the head from a selected data track centre line as defined by the position reference information on the disk.

One major contributory factor to the rounding of position error signals is believed to be the fringing field which extends to either side of the head and extends the effective sensitive width of the head beyond its physical width. The size of the fringing field of a head is relatively independent of the physical width of the head and is determined by features of head construction unrelated to width. As the track density increases in a sector servo file the head width decreases and the greater is the contribution of the fringing field to its effective sensitive width.

By making the width of the individual elements of the servo pattern greater than that of the data track and, necessarily, greater than the physical width of the head, the present invention reduces the contribution of neighbouring elements to the signal sensed by the head via its fringing field. This consequently produces a more linear position error signal in all regions where the head straddles the boundary between elements.

However, in those regions where the head lies wholly within one element the corresponding portion of the respective phase position error signal is a maximum and non longer varies with position. Thus, the position error signal produced by each subset of elements has portions which vary linearly with position interspersed with flat portions which do not vary with position. For this reason, at least three radially overlapping subsets of position reference elements are provided so that the most linear portions of each can be selected and combined. The preferred arrangement is to have three subsets whose radial offset is half the pitch of the data tracks and whose individual elements each have a radial width equal to one and one half times the pitch of the tracks. The linear portions to be combined are identified by comparing the amplitudes of the corresponding three phase position error signals to produce selection signals. These selection signals cause a combining means to output the most linear portions of the three phase signals in succession to produce a composite cyclic linear position error signal.

The selection logic also, preferably, produces further selection signals identifying from which of three possible adjacent tracks the composite position signal is derived and indicating the sign of its slope. These additional selection signals could be used in such a way as to produce an extended linear position signal over plus or minus one and a half data tracks.

It is also preferred that a pattern of the null type is used in which the subsets are circumferentially spaced from each other and in which each subset comprises a plurality of contiguous circumferentially extending concentric bands of elements of alternating magnetic polarity. The bands of each contiguous pair are offset circumferentially by one element width so that the magnetic transition from an element of one polarity to the other in one band coincides circumferentially with a magnetic transition in the opposite sense in the other band. Thus, when the head straddles exactly the boundary between bands, the next flux change is zero. Such a pattern offers superior "on-track" performance in a sector servo file to one in which time dependent demodulation is employed to separate the signal contributions from the two tracks.

Whatever the precise pattern used, if the subsets are circumferentially spaced it is preferred that two radially repeated magnetization patterns are employed and that the three subsets forming each of the two patterns are arranged in the opposite circumferential order from each other. By reflecting the multi-phase servo pattern in this manner about the centre of the servo sector the effect of an oblique motion of the head across the sector is averaged out and does not affect the resultant position signal.

Finally, a by product of the preferred three phase system and of any system employing an odd number of phases, is that, to a good approximation, the sum of the three signals should be zero. Should this not be so then a defect in the disk is indicated. Accordingly, it is a preferred feature of the invention that the three signals are summed and compared with a predetermined threshold set near to zero.

DETAILED DESCRIPTION OF INVENTION

Figure 1:
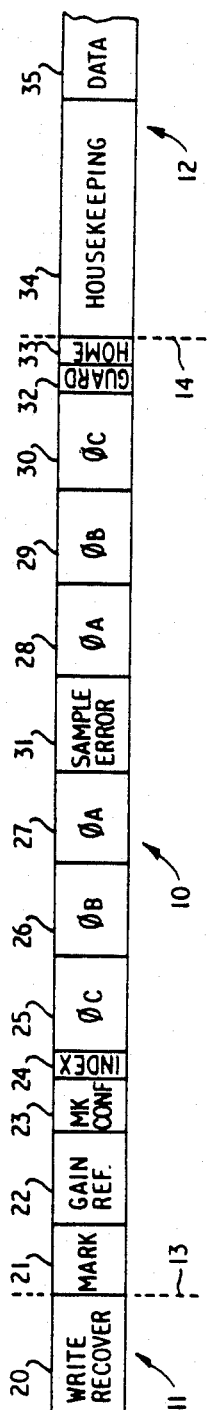
FIG. 1 shows the format of the servo sectors on a magnetizable recording disk according to the present invention, together with portions of adjacent data sectors.

FIG. 1 illustrates a preferred format of a servo sector 10 and portions of neighbouring data sectors 11 and 12 on a magnetizable record disk. The servo sector 10 is delimited by lines 13 and 14. Although drawn rectilinearly for convenience, it will be realised that the band of servo and data sectors shown in FIG. 1 is, in fact, arcuate and concentric with the disk, the lines 13 and 14 being radii of the disk.

At the end of each data sector is an area 20, known as the Write Recovery field, which contains no User data but enables readback circuitry for processing signals, read back by a transducing head from the disk, time to recover from disturbances resulting from any recording (writing) of data in that sector. Each Write Recovery field 20 is followed by a Mark field 21 which is uniquely coded to indicate the start of a servo sector, 10.

As the disk rotates, the next area of the servo sector to be encountered by the head is a Gain Reference field 22 for providing reference signals to enable automatic gain control circuitry to standardize the signals detected by the head, as will be described below. Following the Gain Reference field is a Mark Confirm field 23, which enables verification of the preceding Mark 21. The Mark Confirm field is followed by Index bit 24. A predetermined value of the Index bit indicates that the head is located at a unique circumferential position over the disk.

Following the Index bit, are three zones 25-27 of position reference information for defining the radial position of data tracks on the disk. Each zone provides a different phase $\phi_C$, $\phi_B$ or $\phi_A$ of position reference information. The three phases of position reference information are repeated in reverse order in three further zones 28-30. In between these two regions of position reference information is a Sample Error field 31 which indicates the validity of the position reference information in that particular sector.

At the end of the servo sector 10, following the repeated position reference information are two further code bits. One of these is the Guard bit, 32, whose value indicates whether a given track is within the normally available band of data tracks or lies in a Guard Band region at the boundary of the data tracks. A Home bit, 33, is coded to indicate a unique track known as the Home track (track number 0) which is normally the first of the data tracks available to a User.

The servo sector 10 terminates at line 14, following the Home bit 33, and is followed by the next data sector 12. Area 34 of the data sector contains initialising and housekeeping information and is followed by an area 35 in which User data may be recorded.

Figure 2:
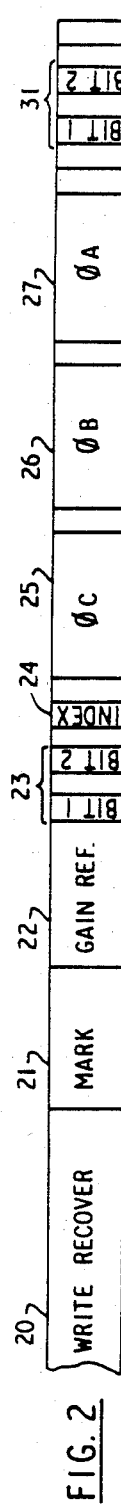
FIG. 2 shows part of the format of FIG. 1 in somewhat more detail.
Figure 3:
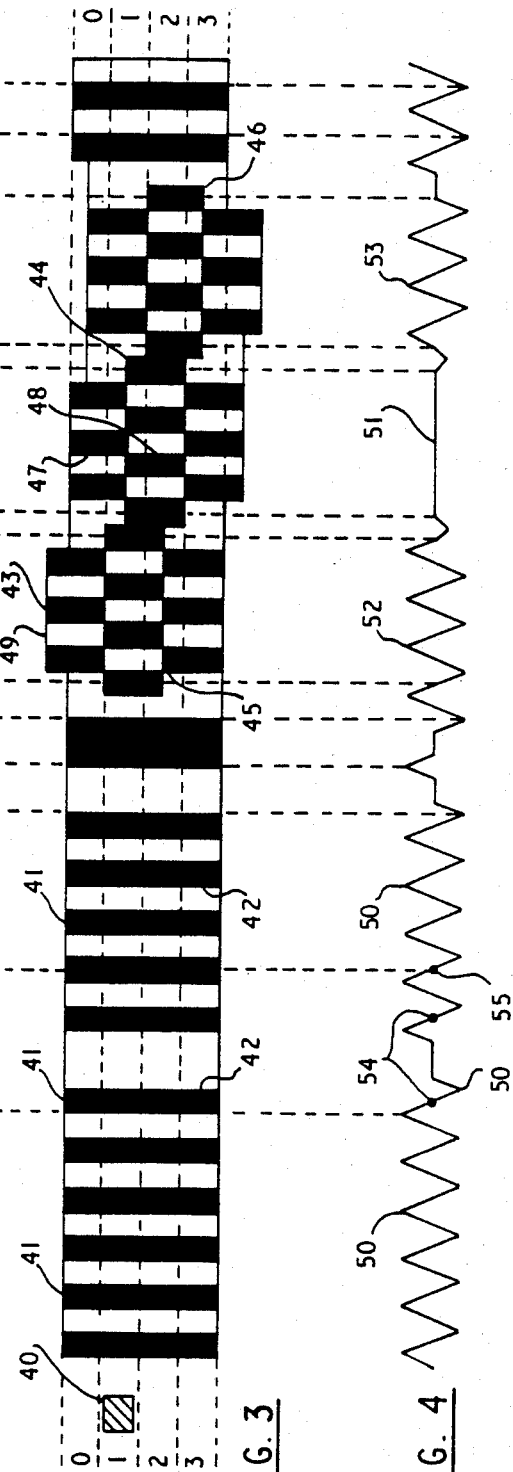
FIG. 3 shows the detailed pattern of magnetization constituting the format of FIG. 2.
Figure 4:
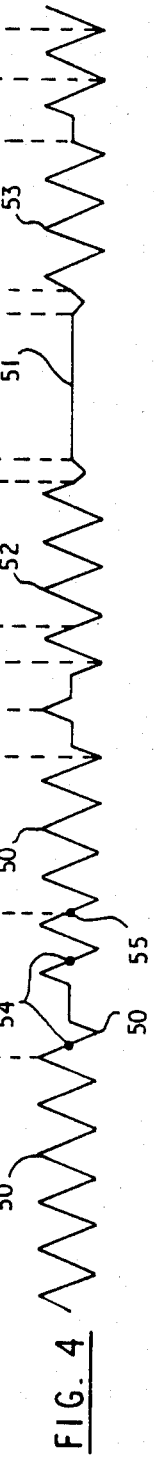
FIG. 4 illustrates the waveform of a signal detected by an associated magnetic transducing head during relative motion of the head across the magnetization pattern of FIG. 3.

A portion of the format of FIG. 1 is repeated, with slightly more detail, in FIG. 2. FIG. 3, which is aligned with FIG. 2, illustrates the actual magnetization of a portion of a typical servo sector over a small band of data tracks numbered 0 to 3. The dimensions of a typical transducing head 40, positioned over track 1, are illustrated in outline. The waveform of the signal detected by head 40 as the magnetization pattern of FIG. 3 passes the head is shown in FIG. 4, also aligned with FIGS. 2 and 3. The waveform is somewhat idealized to emphasize its significant characteristics. In practice, the peaks would be rounded and the intervening portions less linear than shown.

In drawing the magnetization pattern of FIG. 3, the black areas indicate magnetic polarization in a first direction (say, from left to right) and the white, or unmarked, areas indicate magnetic polarization in the opposite direction. It should be realized that all areas of the servo sector are magnetized to saturation in one of these directions or the other and there are no unmagnetized areas.

Considering again, briefly, the various portions of the data and servo sectors shown, it will be observed that the Write Recovery Field 20, the Mark 21, the Gain Reference Information 22, the Mark Confirm bits and the Index 24 all consist of radial bars of magnetization of alternating polarity. These extend across the entire surface of the disk between the inner and outer diameters of its usable area. The signal detected by the head in passing over these regions has peaks 50 which correspond to the transitions 42 from one polarity to the other. The position and sense of these peaks is fixed in every servo sector though, of course, their amplitudes may vary. The Sample error field 31, however, consists of a pair of bits which may be differently encoded in respect of different tracks. In the state shown in FIG. 3, the Sample error bits indicate that the position reference information is good.

The position reference information zones 25, 26 and 27 each comprise a subset of radial bar elements 43 alternating with bars 49 of the opposite polarity. The bar elements 43 and 49 extend radially over one and a half data track widths. The subsets are radially offset from each other by one half of the data track width. This pattern of position reference information extends circumferentially across the sector, as shown, and is repeated radially across the usable area of the disk. To illustrate the offset between the phases most clearly only three rows of elements have been shown for each phase.

Every alternate boundary, such as 44, 45 or 46, between adjacent rows, or bands, of elements in a subset defines the centre of a corresponding data track, in this case of tracks 1, 2 and 3. In each subset, the bar elements 43 of like polarity are offset circumferentially from each other in alternate rows by the width of an element to form a servo pattern of the known "null" type in which equal and opposite elementary transitions, such as 47 and 48, are aligned in adjacent rows.

Thus when the signal detected by head 40, passing over any of the position reference information in phase zones 25, 26 or 27, is zero, the head is aligned either with a data track centre or with a data track boundary. Which of a group of three adjacent data tracks the head is positioned over depends on which of the three phase signals is zero. In the example shown, the signal from head 40 is zero, as shown by portion 51 of FIG. 4, when passing over the boundary 44 of the $\phi_B$ phase pattern, corresponding to the centre of track 1. When the head 40 passes over the $\phi_A$ and $\phi_C$ phase patterns, the corresponding signal has the waveform shown in portions 52 and 53. The peak amplitude of these signals indicates that head 40 is displaced by at least one half track width from the nearest row boundaries of the $\phi_C$ and $\phi_A$ phases i.e. the head does not straddle these boundaries at all. At any position other than alignment with a row boundary, the signal from head 40 would comprise an alternating peaked waveform, similar to portions 52 and 53 but of lesser amplitude.

Accordingly, either the peak amplitudes or the areas under the signal portions 51, 52 and 53 can be used to provide a measurement of position error from their respective track centres. As will be described in connection with FIGS. 6 and 7, the more reliable area demodulation technique is employed and signal portions 51, 52 and 53 are separately rectified, integrated and gain adjusted, as also are the corresponding signal portions derived from the reversed zones 28, 29 and 30, to provide the three phases of position error signal shown in FIG. 5.

Figure 5:
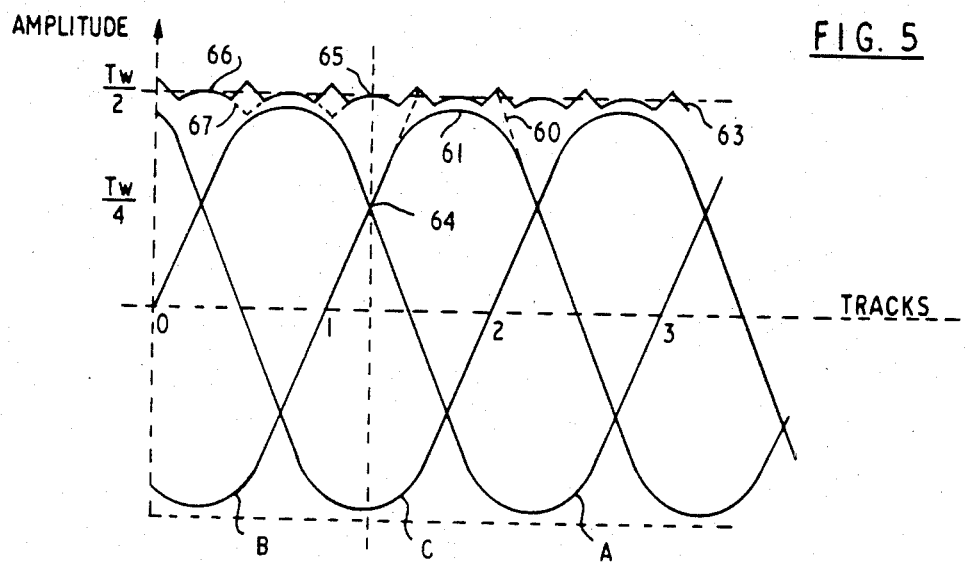
FIG. 5 shows three phase position error signals derived from the signal of FIG. 4 and associated analog signals for both position and gain control in the system of FIG. 6.
Figure 5:
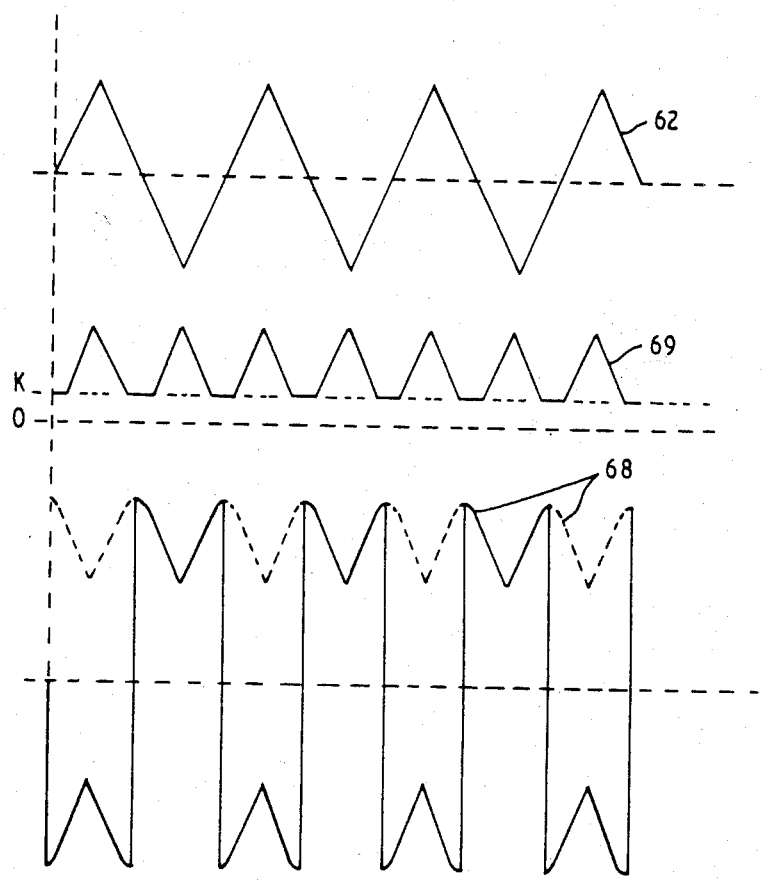

In FIG. 5, the variation of amplitude of the demodulated position error signals A, B and C, from $\phi_A$, $\phi_B$ and $\phi_C$ phase patterns respectively, is shown over tracks 0 to 3. It can be seen that this variation is cyclical and that each phase signal repeats itself over three tracks. Because the radial width of the bar elements, such as 43 and 49, making up the position reference information is significantly greater than the physical width of the head 40 (and of the data tracks), the sensitive width of the head, which is a combination of its physical width and its magnetic fringing field, is sufficiently small with respect to the width of the rows of elements making up the position reference information that the head is relatively little affected by crosstalk from neighbouring rows which could significantly reduce the amplitude or linearity of the signal. Consequently, the resultant position error signals A, B and C are extremely linear, particularly over a range of $\pm\frac{1}{4}$ track from the track centre, and are approximately linear even beyond that.

Beyond this range, each phase of position error signal, as indicated by the dashed line 60, would, ideally, remain linear until the half track point. It would then be of constant amplitude over the next half track, corresponding to the head lying wholly within the radial bounds of one of the rows of elements, and, at the next track centre, would start to vary linearly again with the opposite slope. In practice, the effect of the fringing field is to round and lower the signal as shown by portion 61. Different heads, in a multi-head file, produce different degrees of rounding depending on both the physical and the effective widths of the head. However, it has been found that the derived position error signals are substantially linear within the $\pm\frac{1}{4}$ track regions mentioned although the signals from different heads do not necessarily have the same slope. Thus, for any particular head a substantially linear position error signal can be selected from one of the three phase signals at any radial position of the disk.

Figure 6:
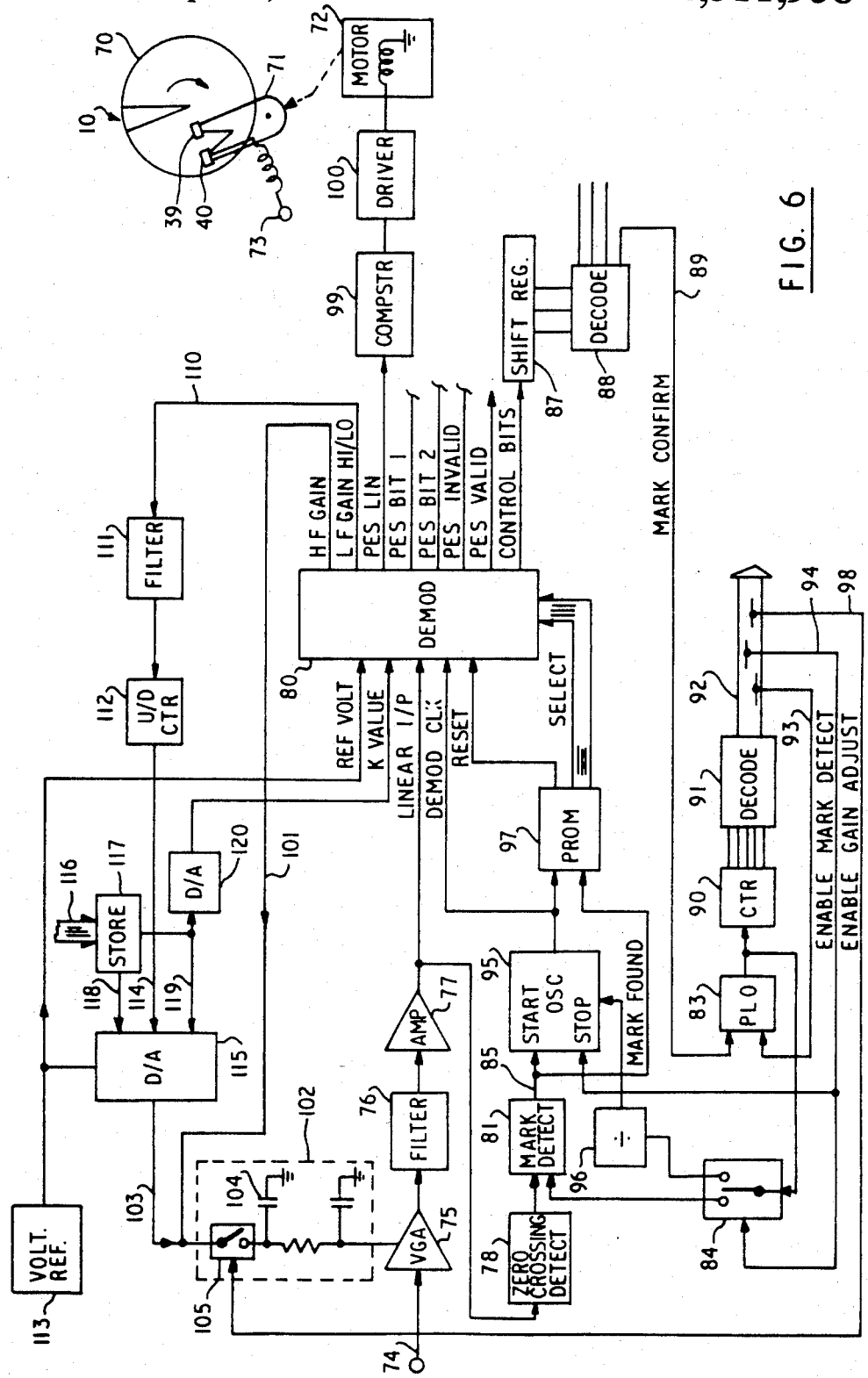
FIG. 6 illustrates schematically a head positioning system forming part of a disk file according to the present invention.

A head positioning system for positioning transducing heads over the surface of an information storage disk is shown in FIG. 6. As illustrated, a disk 70 includes on its surface position reference information in servo sectors 10 of the type illustrated in FIGS. 1 to 3, only one of which is shown. The disk is rotated in the direction of the arrow past transducing heads 39 and 40 covering inner and outer areas of the disk, respectively.

The heads are mounted on a head support arm 71 which is rotatable about the axis shown, by an actuator motor 72. The remainder of the head positioning system consists of a signal processing channel for processing signals received from a selected one of the heads of the disk file. Although portions of this channel are common to both servo and data signal processing, it is primarily those components associated with the processing of the servo sectors 10 of FIG. 1 which are illustrated.

Figure 8:
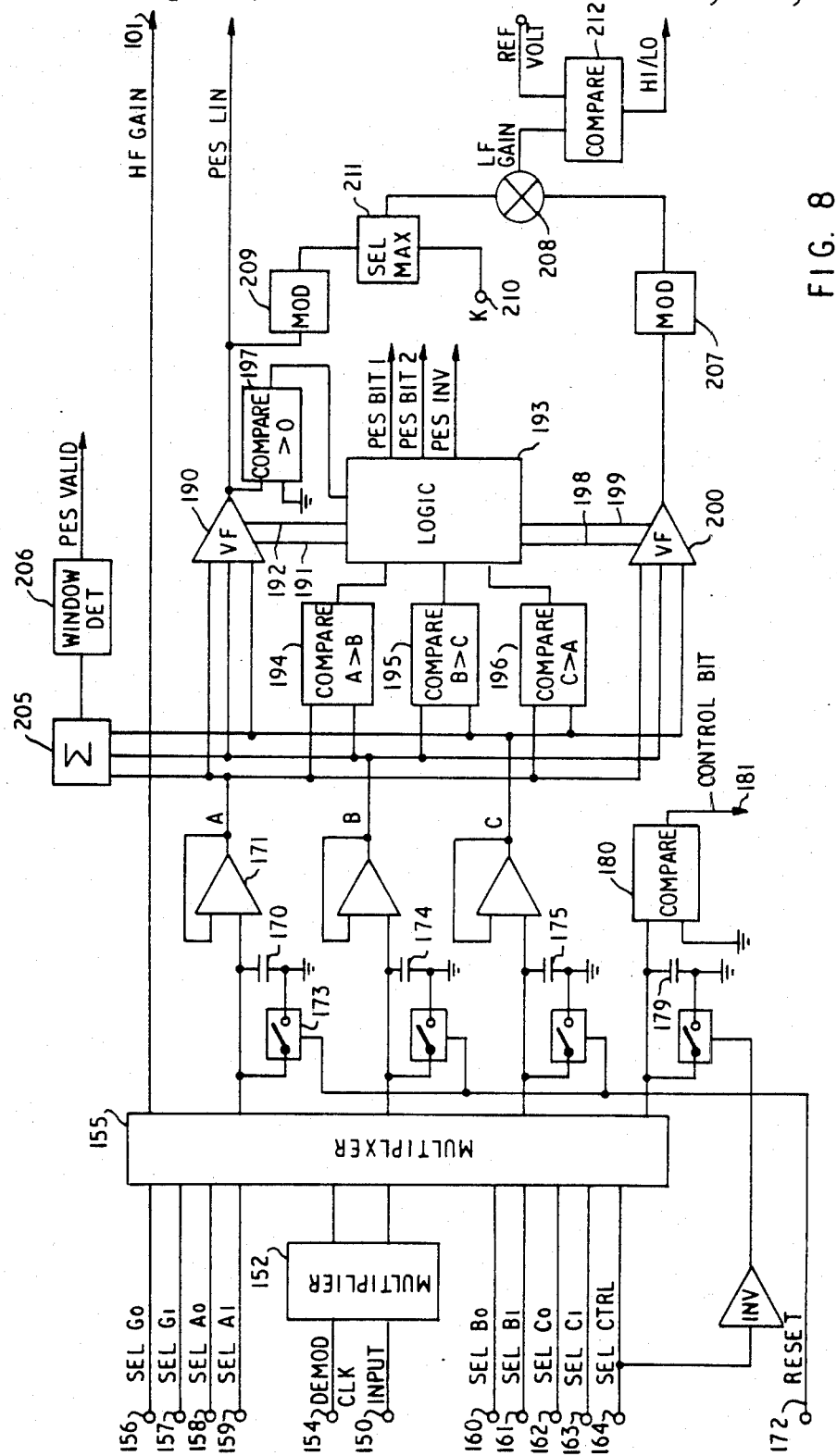
FIG. 8 is a schematic block diagram of a demodulator circuit forming part of head positioning system of FIG. 6.

Signals from one of the transducing heads, such as head 40, available at a terminal 73, are applied on line 74 to a variable gain amplifier 75. After being filtered to remove noise in filter 76 the head signals are further amplified in amplifier 77 and applied both to a zero crossing detector 78 and a demodulator 80. The basic purpose of the demodulator, as will be further described in connection with FIG. 8, is to derive, from the position reference information portions of the input signal, a position error signal, as shown in FIG. 5, which varies linearly with off-track displacement of the selected transducing head. However, before the demodulator is enabled, the presence of a servo sector must first be recognized by detection of a Mark 21 at the start of the servo sector.

Referring back to FIGS. 3 and 4, the characteristic of a Mark which distinguishes it from other signals recorded on the medium is a uniquely timed interval between two negative going zero crossings 54 of the waveform of FIG. 4. The Mark also includes a subsequent zero crossing 55 at normal spacing from the latter of the two zero crossings 54.

The Mark is detected by Mark Detect logic 81 in response to a correctly spaced succession of negative going zero crossings. Zero crossings are detected by zero crossing detector 78 whose output changes level upon the occurrence of a negative going zero crossing and is reset at a predetermined positive threshold. The Mark Detect logic is clocked by signals derived from the output of a phase locked oscillator 83. The oscillator output is applied to the Mark Detect logic by a two-way switch 84 which is operated by a signal, "Enable Mark Detect", generated by timing circuitry shortly before the start of every sector. If a Mark is present, a signal "Mark Found" is produced on line 85.

Figure 7:
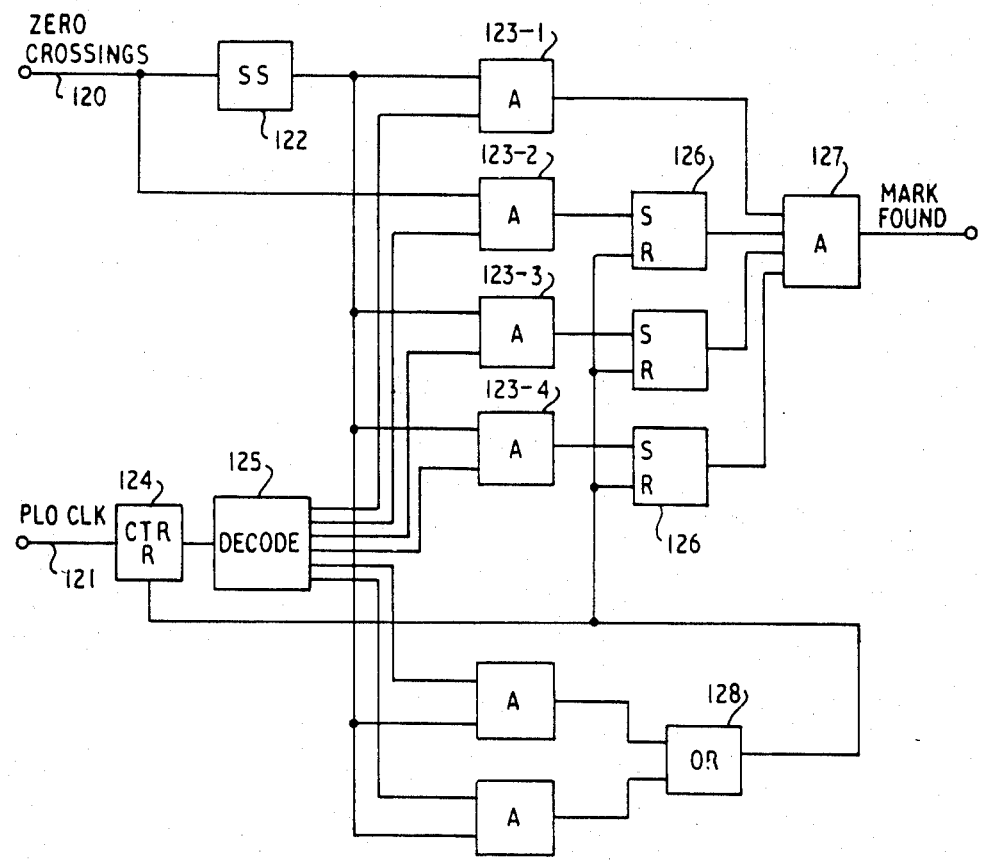
FIG. 7 is a schematic circuit diagram of a mark detection circuit employed in the system of FIG. 6.

The Mark Detect Logic 81 is shown in greater detail in FIG. 7. Zero crossing indications from circuit 78, are received on a line 120 and the PLO output from switch 84 is received on line 121. The zero crossing signal is applied to a single shot 122, which is triggered by negative going crossings, and to one of AND circuits 123. The PLO output is counted by a counter 124 and a decode circuit 125, produces a series of gating windows in response to the contents of the counter. Two of these gating windows gate pulses from single shot 122 through gates 123-3 and 123-4 to set a pair of latches 126 in response to the first and second zero crossings 54 of the Mark. One of the gating windows also enables AND 123-2 to set another latch 126, providing the zero crossing indication on line 120 is "UP", confirming the absence of a zero crossing between crossings 54. When all three latches have been set, the next zero crossing indication on line 120 causes a further AND circuit 123-1 to satisfy AND circuit 127 which produces the Mark Found signal. If an incorrectly positioned zero crossing is detected, the Mark Detect logic is reset immediately by a pulse from OR 128. Otherwise, it is reset after a Mark has been detected by the next zero crossing of the Gain field.

If the Mark is genuine, the two Mark Confirm bits 23 will follow after a predetermined interval and will have the predetermined opposite phase relationship shown in FIGS. 3 and 4. At the end of the predetermined interval, demodulator 80, as will be explained later, demodulates the head signal to produce a pair of Control bits which are read out into shift register 87. If these bits have the required phase reversal as determined by a decoding circuit 88, a "Mark Confirm" signal is produced on line 89.

The phase locked oscillator 83 is conventionally phase locked to the Mark Confirm signals. The output of the oscillator is counted by counter 90 whose output is decoded by a decoder 91. The decoder produces a number of outputs on bus 92 to time various operations of the head positioning system and of the disk file. One of these is the "Enable Mark Detect" signal applied to switch 84. Another output, on line 93, is fed back for phase comparison with the Mark Confirm signals and the phase difference between the two signals is used to control the frequency of the PLO 83 in conventional manner. The PLO 83 has to provide stable multiple outputs for various purposes so that its response to any phase shift is relatively slow. It is thus locked to the Mark Confirm signals in frequency but not always in phase. Consequently, the output from PLO 83 may not be accurately enough in phase with the signals from any individual sector to time the synchronous demodulation of the gain and position reference information by demodulator 80.

For this reason, a further oscillator 95 is provided which may be stopped and started as desired. During a data sector, the oscillator 95 is synchronized to a submultiple of the PLO output frequency by way of switch 84 and a divider 96. Upon the occurrence of the Enable Mark Detect signal on line 94, the synchronizing input is removed by operation of switch 84 and the oscillator is stopped.

As soon as a Mark is detected by circuit 81, the Mark Found signal causes oscillator 95 to restart exactly in phase with the particular sector. The oscillator then free runs at the previously synchronized frequency and produces a pulse train known as the Demodulator Clock (FIG. 9) which is applied to demodulator 80. The oscillator output is also applied to a programmable read only memory (PROM) 97 together with the Mark Found signal. The PROM 97 generates selection windows (FIG. 9) for the various synchronous demodulation operations performed by demodulator 80 as will now be described with reference to the schematic circuit diagram of FIG. 8 and the waveform diagrams of FIGS. 5, 9 and 10.

Figure 9:
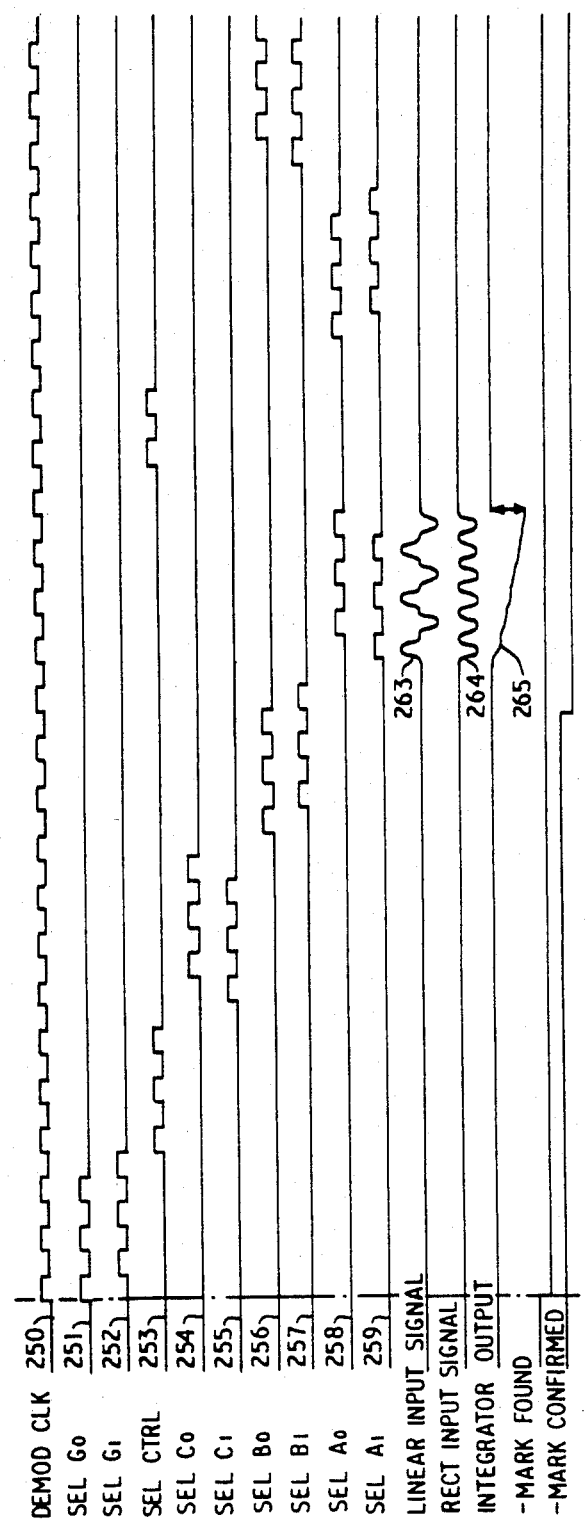
FIG. 9 illustrates the waveforms of various timing signals occurring in the demodulator of FIG. 8 together with representative waveforms illustrating the demodulation of analog input signals from the transducing head.

FIG. 8 is a schematic block diagram of the demodulator 80 of FIG. 6. The linear input signal from amplifier 77, FIG. 6, is applied, in FIG. 8, on line 150 to a multiplier 152. The Demodulator Clock signals from start/stop oscillator 95 are also applied to the multiplier on line 154. A typical Demodulator Clock waveform 250 and a representative portion 263 of the input signal on line 150 are shown in FIG. 9. The effect of multiplying the Demodulator Clock by the input signal portion 263 is to produce a rectified version of the input signal, shown as waveform 264 in FIG. 9.

The multiplier output signals are routed by a multiplexer 155 to one of a number of outputs in accordance with Selection Signals applied on lines 156–64 corresponding to the output lines from PROM 97, FIG. 6. Typical pairs of selection signals are shown as waveforms 251–259 each pair identifying a respective portion of the rectified sector signals to be integrated.

In the example discussed above, the presence of signals SEL $A_o$ and SEL $A_1$ (waveforms 258 and 259, FIG. 8) on the lines 158 and 159 indicates that the linear input signal 263 currently applied to the multiplier 152 is derived from the A-phase position reference information 27. Accordingly, the multiplexer 155 directs the rectified signal 264 to an integrator which integrates the successive cycles as shown in waveform 265, FIG. 9. A further integration of the signals from the second A-phase region 28 is performed in similar manner and the sum of the integrated signals then represents the head position with respect to the A-phase position reference information for that particular sector. This value corresponds to a point on the waveform A of FIG. 5.

The integrator for producing the A-phase signal comprises a capacitor 170 which is charged by a current source within the output stage of multiplexer 155. A voltage follower 171 buffers the voltage produced on the capacitor. The integrator is reset by means of a switch 173 in between samples. The reset signal on line 172 is produced by PROM 97, FIG. 6, and is the inverse of Mark Found. Similar capacitors 174 and 175 are employed to integrate the linear input signal portions derived from the B and C - phase position reference information to produce corresponding position error signals which lie on the waveforms B and C of FIG. 5. The selection signals SEL $B_0$, SEL $B_1$, and SEL $C_0$, SEL $C_1$ are shown as waveforms 256, 257 and 254, 255 in FIG. 9.

Besides the position reference information, the linear input signal also comprises Gain reference information from field 22. This information is also rectified by multiplication of the corresponding portion of the input signal by the Demodulator Clock waveform in multiplier 152. Selection signals SEL $G_0$, SEL $G_1$ cause the respective rectified signal portions to appear as an output current "HF Gain" at the appropriate outputs of multiplexer 155.

The Gain information is not integrated by the circuit of FIG. 8. Instead, the rectified gain signal HF Gain is output on line 101 and its integration is effectively performed in the comparator circuit 102 (FIG. 6) as will be described below.

The Control information, it will be recalled, consists of a short sequence of transitions, of which certain ones, occurring at predetermined times within a sector correspond to bits of control information. The corresponding signal portions (Ref. FIG. 4) are selected by the signal SEL CTRL (waveform 253, FIG. 9) and multiplied by the Demodulator Clock in multiplier 152. The predetermined interval between the significant transitions is such that the sense of the corresponding output pulses is not altered by the multiplication. Thus the output pulses are positive or negative according to the value of the recorded control bit. Each control bit output pulse is integrated by a capacitor 179. The voltage on the capacitor is positive or negative according to the value of the bit and is compared with Ground in a comparator 180. The output of the comparator on line 181 corresponds to the input line to shift register 87, FIG. 6. The capacitor 179 is reset whenever the signal SEL CTRL on line 164 goes negative.

Considering now the further processing of the three position error signals A, B and C, it was pointed out in connection with FIG. 5 that each of these signals is accurately linear for $\pm\frac{1}{4}$ track about its zero crossings. Consequently, a linear signal from one of the three phases can always be selected for any position of the head. A composite linear position error signal, PES LIN, as shown in waveform 62 of FIG. 5, is produced from the three phase position error signals A, B and C by a switchable voltage follower 190.

Figure 10:
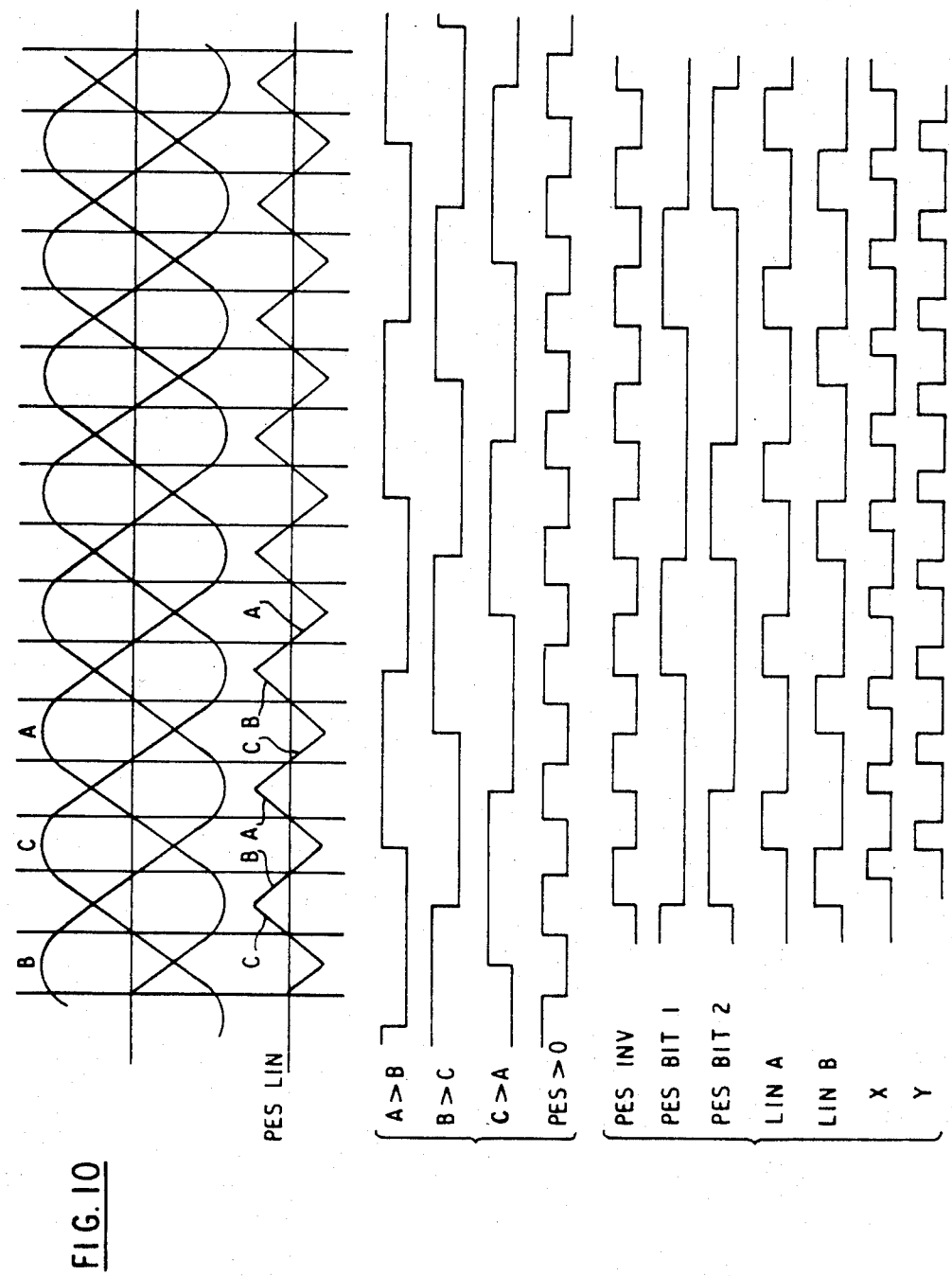
FIG. 10 shows again the three phase position error signal of FIG. 5 and various selection logic signals derived therefrom in the circuit of FIG. 8.

The switching of voltage follower 190 is controlled by signals LINA and LINB, as shown in FIG. 10, on two of the output lines 191 and 192 of a combinatorial logic circuit 193. This logic circuit not only switches the voltage follower 190 to provide the signal PES LIN but also provides the signals PES BIT 1, PES BIT 2 and PES INV as shown in FIG. 10. The first two of these signals identify which of the three track types the signal PES LIN is derived from at any given position. The third signal PES INV indicates whether the slope is positive or negative. These signals contain sufficient information together with the signal PES LIN, to determine the position of the head over an extended range of three tracks.

However, during normal track following operations, such an extended determination of position is not necessary and, as shown in FIG. 6, the signal PES LIN is applied directly to a phase compensator 99 whose output is applied to a driver amplifier 100. The amplifier 100 drives the head positioning motor 72 in such a way as to tend to reduce the linear position error signal to zero.

Returning again to FIG. 8, the inputs to the logic circuit 193 are provided by four comparators 194–197. Comparators 194, 195 and 196 compare the three phase position error signals A, B and C with each other to determine when the conditions $A>B$, $B>C$ and $C>A$ respectively are satisfied. The binary waveforms resulting from these comparisons over a number of tracks are shown in FIG. 10. The fourth comparator 197 determines when the signal PES LIN is greater than zero and feeds this back to the logic circuit 193. The output waveform from this comparator also is shown in FIG. 10.

From these inputs, the logic circuit 193 produces the outputs shown in FIG. 10, namely the signals PES INV, PES BIT 1, PES BIT 2, LINA, LINB, and two further waveforms X and Y identifying the quarter track points. The relationship of each of these signals with the three phase position error signals A, B and C is evident from an inspection of FIG. 10. The signals X and Y are applied on lines 198 and 199 to switch a further voltage follower 200 for purposes to be explained below.

A useful check on the validity of the position error signal is provided by summation circuit 205. To a good approximation, the sum of the three phase signals A, B and C should be zero at all positions of the head. This sum is produced by circuit 205 and is compared with a voltage window centred on zero volts in window detect circuit 206. If the sum is within the window a signal, PES VALID, is produced. The absence of this signal indicates a fault in the position reference information on the medium.

The remaining portions of FIGS. 6 and 8 are concerned with the automatic control of the gain of variable gain amplifier 71 by means of the signal HF GAIN and a further signal LF GAIN.

As will be clear to a person skilled in the art, the simple difference $(p-q)$ between the head signal contributions, p and q, from adjacent rows of elements of one of the phase $\phi_A$, $\phi_B$ or $\phi_C$ of the position reference information is not an accurate indication of displacement from the row boundary. One reason for this is that the flying height of the head is different at different radial positions over the disk and this causes the amplitude of the detected signals to vary. Conventionally, this problem is overcome by employing automatic gain control in which a signal (p+q) which is the full width response of the head is separately determined and used to normalise the amplitude of the position error signal. The value of the position error signal is thus given by (p−q)/(p+q) multiplied by a constant.

In the channel of FIG. 6, the full width response of the head (p+q), is represented by the magnitude of the HF GAIN current signal. As described above this signal is derived from the Gain Reference information 22, preceding the position reference information. Because the radial bars 41 of alternating polarity (FIG. 3) which make up the Gain Reference information are uninterrupted radially, the output of the head necessarily represents the full width response from a particular head. The HF GAIN current is compared in a comparator 102 with a reference current on line 103 by applying both currents to an integrating capacitor 104 through a switch 105. The switch is closed by a signal "Enable Gain Adjust" produced on output line 98 of bus 92 at a time corresponding to the detection of the Gain Reference information by the head. Any difference between these currents charges the capacitor 104. The voltage on capacitor 104 is filtered in an R-C filter and is applied to control the gain of the variable gain amplifier 75 so as to normalise the amplitude of the output signals from the head arriving on line 74. The feedback loop formed by line 101 and comparator 102 is a high frequency gain control loop of sufficiently high bandwidth (of the order of a few thousand Hertz) for automatic gain control to be effected within the same sector.

The problem with such conventional automatic gain control, as thus far described, is that it does not correct for and may even exacerbate variations in off-track response between heads. Off-track response is the gain or slope of the position error signal derived from a particular head as it moves off-track.

Figure 11:
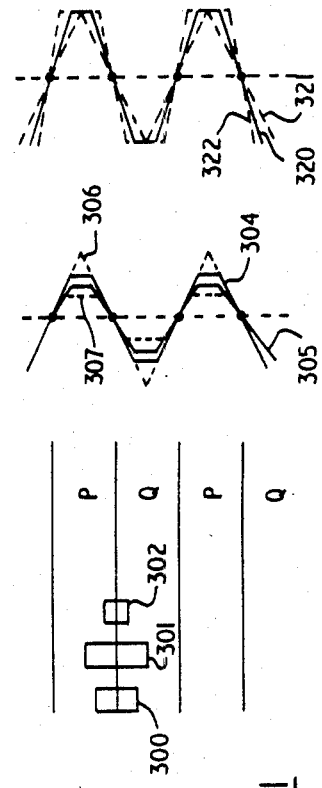
FIG. 11 illustrates the variations in position error signal slope resulting from the use of conventional automatic gain control with heads of different widths.

FIG. 11 illustrates, in general terms, the effect of a conventional AGC loop, in a variety of circumstances. Four rows of position reference information of alternating type, P and Q, are shown together with three heads, 300, 301 and 302. Head 301 is assumed to have an effective width exactly equal to the row width whereas heads 300 and 302 have widths of ⅔ and ⅓ of a row respectively.

Waveform 304 represents the idealised variation of the difference (p−q), between signal contributions from tracks P and Q detected by head 300, at one flying height, as the head moves orthogonally across the tracks. Waveform 305 represents the same difference function detected by head 300 at a different flying height and illustrates the need for conventional gain control circuitry. The waveform 320 in the right hand diagram illustrates the effect of conventional automatic gain control circuitry in normalising the waveforms 304 and 305 by means of the function (p−q)/(p+q) as described above.

The waveforms 306 and 307 from heads 301 and 302, representing the absolute difference (p−q), differ from waveform 304 as shown by the dotted line portions, assuming an identical flying height and head response. However, if these waveforms 306 and 307 are normalised by means of the algorithm (p−q)/(p+q), the result is waveforms 321 and 322. These it can be seen have the correct values at "on track" and ½ track (maximum) deviations but do not have the correct slope in between. Thus, if the conventional algorithm is employed with heads of different widths, the "off-track gain" is not of constant slope even though its variation is linear.

As discussed above, excessive variation in off-track gain can produce under or over-correction and instability in a high density track-following servo system where the highest possible track following loop gain is needed to position the head very accurately over the selected track and to minimise off-track deviations. Off-track gain variation can also cause problems in track accessing servo systems, such as that described in European Published Patent Application No. 013326 where sampled position error signals are compared with a continually available model position error signal of the same general form. It is important that the sampled position error signals are linear and of substantially constant off-track gain, irrespective of which of a number of transducing heads on different disk surface they come from.

The problem is overcome, in the system of FIG. 6, by adjustment of the reference current applied on line 103 to the comparator 102. The amount of the adjustment is dependent upon the magnitude of the "LF GAIN" signal derived in demodulator 80 which represents the position error signal slope, and upon additional feedforward, or predictive, inputs.

The LF GAIN signal is produced by the remaining circuitry of FIG. 8 as will now be described. Essentially the LF GAIN signal is a measurement of the rate of change of the linear position error signal per track of displacement, i.e. of its slope or off-track gain and is substantially independent of the width of a particular head. By combining selected portions of the three phase signals A, B and C, FIG. 5, a signal approximating closely to this measurement can be provided at any position of the head relative to the tracks. By using stored information on the width of each individual head, the accuracy of the approximation can be increased further and the resulting LF GAIN signal waveform is shown at 63 in FIG. 5.

To understand how the LF GAIN signal is produced, it is instructive to consider the three phase waveforms shown in FIG. 5. If these had the ideal form of dotted line 60, then the amplitude of the flat top portion of each phase would represent the position error signal magnitude at a displacement of half a track, Tw/2, from the data track centre. Since one of the three phases would always be a maximum at every head position, the measurement required would be a simple matter of selecting the appropriate invariant phase and inverting as necessary.

However, as can be seen, the signals A, B and C are rounded and non-linear near to their peaks. Nevertheless, an approximate measurement of the Tw/2 value can be obtained, at any head position, by adding the moduli of the two more linear of the three phase signals together. For example, at the quarter track positions such as 64 in FIG. 5, the A and B phases are more linear than the C phase. Adding the amplitudes of the A and B signals, which are exactly equal to Tw/4, gives an accurate measurement of Tw/2, represented by point 65 on waveform 63. At other positions than the quarter track positions, one of the two phase signals will be outside its linear range of ±¼ track and addition of the two phase amplitudes will not be so accurate. Accuracy will be lowest at the on-track positions. The locus of the sum of the moduli of the two most linear position signals includes the curved portions 66 of waveform 63 and the dotted portions 67, as illustrated.

Since the on-track positions are the most likely positions for the head to be located during track following operations, it is important to correct for the potential inaccuracy in this region. This is achieved by the addition of a constant voltage, K, to the modulus function in a narrow region close to each track centre.

A portion of the modulus function is generated by the voltage follower 200. This responds to selection signals X and Y on lines 198 and 199 by outputting a different one of the A, B or C signals every quarter track. The signal chosen is the larger of the two more linear signals within that quarter track. The output of the voltage follower is shown in the lower waveform of FIG. 5. This signal is applied to modulus circuit 207, FIG. 7, which inverts negative portions as shown by the dotted lines. The output of the modulus circuit 207 is the upper envelope 68 and is applied to a summing junction 208.

The other portion of the gain function is derived from the linear position error signal PES LIN (waveform 62, FIG. 5) output by voltage follower 190. This is rectified by modulus circuit 209 and if added to waveform 68 would produce the approximate gain measurement function defined by signal portions 66 and 67. However, it is firstly combined with the correction voltage, K, which is provided at a terminal 210. A maximum select circuit 211 selects whichever is the greater of waveform 62 and the voltage K and applies the resulting waveform 69 to summing junction 208. In this way the correction value is only applied when the deviation from linearity of one of the signals being combined exceeds a predetermined amount.

The two waveforms 68 and 69 are summed in junction 208 to produce the desired gain measurement signal 63. Finally, the LF GAIN signal is compared with an accurate reference voltage in the comparator 212 to produce a binary output indicating whether the signal is higher or lower than an accurate reference voltage.

Referring again to FIG. 6, the LF GAIN Hi/Lo signal, as has been indicated above, is fed back to adjust the reference current applied to line 103 with the object of standardizing the off-track response of all the heads. This feedback loop is of insufficiently high bandwidth to correct the gain during the same sector in which the gain measurement was made but is effective to adjust the gain over a number of sectors.

The binary Hi/Lo signal is applied on line 110 to a digital filter 111 which responds to a succession of Hi or Lo pulses by incrementing or decrementing a 4 bit UP/-DOWN counter 112. The number stored in the counter 112 represents digitally the adjustment to the reference current on line 103 necessary to restore the gain function LF GAIN to the reference voltage, which is derived from reference voltage source 113. The 4-bit count in counter 112 is applied on bus 114 to a digital to analog converter 115 and converted to a current on line 103. The digital to analog converter 115 also derives its internal constant current reference from the reference voltage source 113.

Two other inputs to the D/A converter 115 can also affect the reference voltage adjustment. Both of these are derived from externally supplied information on bus 116 indicating which head is to be selected. This information is applied to a store 117 which may be a read only memory or part of a microprocessor. Because of differences in flying height between inner and outer regions of the disk, it can be predicted that there will be differences in the off-track response of heads which operate over different radial bands. The radial band over which a selected head flies is indicated by the least significant bits of its address. In response to these bits, the store 117 produces a predictive digital output on line 118 which is also applied to D/A converter 115 to adjust its output accordingly. Because no feedback is employed, this correction helps to achieve a faster adjustment of gain than would be achieved by relying on the LF gain control loop alone.

A similar direct adjustment is made for known variations in width between heads, since it is known that the degree of rounding of the position error signal depends on head width. The store 117 is responsive to the head address information to provide to the D/A converter 115, on a bus 119, a digital adjustment value related to the width of the selected head. Again, because no feedback is employed, this predictive technique helps to achieve a faster adjustment of gain than the LF gain control loop acting alone could achieve.

The head width adjustment from store 117 is also applied to a digital to analog circuit 120 which generates from it one of three possible analog values for the voltage K for provision to terminal 210, FIG. 8, to further improve the accuracy of the gain measurement 63.

I claim:

1. A magnetizable recording disk divided into data sectors, each having a plurality of concentric tracks for the recording and reproducing of information by an associated magnetic transducing head, and having servo sectors, interspersed with the data sectors, containing position reference information defining the radial position of the data tracks for an associated head positioning servo system, the position reference information comprising a circumferentially extending and radially repeated magnetization pattern having at least two radially offset subsets of elements from each of which a different phase of radial position error signal, indicating displacement from a data track centre line, can be derived, the record member being characterised in that the position reference information pattern comprises at least three such subsets of elements, whose radial offset from each other is less than the pitch of the data tracks and whose individual elements each have a radial width greater than the pitch of a data track.

2. A magnetizable recording disk as claimed in claim 1 having three subsets whose radial offset from each other is half the pitch of the data tracks and whose individual elements each have a radial width equal to one and one half times the pitch of the data tracks.

3. A magnetizable recording disk as claimed in claim 1 in which the three subsets are circumferentially spaced from each other.

4. A magnetizable recording disk as claimed in claim 3 in which each subset comprises a plurality of contiguous circumferentially extending concentric bands of elements of alternating magnetic polarity, each contiguous pair of bands being offset by the circumferential width of an element so that the magnetic transition from an element of one polarity to the other in one band coincides circumferentially with a magnetic transition in the opposite sense in the other band.

5. A disk file comprising a rotatable magnetizable recording disk for the storage of information, an electromagnetic transducing head for writing information on and reading information from the magnetizable disk during relative motion therebetween, and a head positioning actuator responsive to actuator control signals to position the transducing head radially of the disk, the disk surface being divided into data sectors, each having a plurality of concentric tracks on which data may be written by the transducing head, and servo sectors interspersed with the data sectors containing position reference information defining the radial position of the concentric data tracks, the position reference information comprising a circumferentially extending and radially repeated magnetization pattern having at least two radially offset subsets of elements, the disk file further comprising a position error signal generating means arranged to receive signals read by the transducing head and to generate from them, corresponding to each subset of the position reference information, a different phase of radial position error signal indicating the displacement of the head from a data track centre line, and to combine the different phase position error signals into a composite signal, and feedback means for feeding back the composite position error signal as a control signal to the head positioning actuator so as to correct for any displacement of the head from a selected data track centre line as defined by the position reference information, the disk file being characterised in that the position reference information pattern comprises at least three such subsets of elements from which the position error signal generating means generates at least three respective phases of radial position error signal and combines them to form said composite signal, and in that the radial offset of the three subsets of elements from each other is less than the radial width of the transducing head and in that the individual elements of the subsets each have a radial width greater than the transducing head width.

6. A disk file as claimed in claim 5 having three subsets whose radial offset from each other is half the pitch of the data tracks and whose individual elements each have a radial width equal to one and one half times the pitch of the data tracks.

7. A disk file as claimed in claim 6 in which the three subsets are circumferentially spaced from each other.

8. A disk file as claimed in claim 7 in which each subset comprises two contiguous circumferentially extending bands of elements of alternating magnetic polarity, the bands being offset by the circumferential width of an element so that the magnetic transition from an element of one polarity to the other in one band coincides circumferentially with a magnetic transition in the opposite sense in the other band.

9. A disk file as claimed in claim 6 in which the position error signal generating means generates three phases only of position error signal, the file including amplitude comparison means for comparing the magnitudes of the three phase signals, selection logic for generating selection signals corresponding to the most linear quadrants of each phase position error signal and error signal combining means responsive to the selection signals to combine the most linear quadrant portions of each phase position error signal to produce the composite position error signal.

10. A disk file as claimed in claim 9 in which the selection logic produces further selection signals, identifying from which of three possible adjacent track types the composite position error signal is derived, and another signal indicating the sign of the slope of the composite position error signal.

11. A disk file as claimed in claim 6 in which the position error signal generating means generates an odd number of phases of position error signal, the file including summing means for summing all the phases of position error signal and window comparison means for comparing the summed signal magnitude with a predetermined window.

* * * * *